(12) United States Patent　　　　　　(10) Patent No.:　US 12,696,839 B2
　Yamaoka et al.　　　　　　　　　　　　(45) Date of Patent:　　　Aug. 4, 2026

(54) PUSH POWER TOOL

(71) Applicant: Nanjing Chervon Industry Co., Ltd., Nanjing (CN)

(72) Inventors: Toshinari Yamaoka, Nanjing (CN); Chao Yang, Nanjing (CN); Hao Wang, Nanjing (CN); Kang Wang, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 419 days.

(21) Appl. No.: 18/471,398

(22) Filed: Sep. 21, 2023

(65) Prior Publication Data

US 2024/0147899 A1　　May 9, 2024

(30) Foreign Application Priority Data

Nov. 8, 2022　(CN) ......................... 202211394283.3

(51) Int. Cl.
　A01D 34/82　　　(2006.01)
　A01D 34/68　　　(2006.01)
　A01D 34/74　　　(2006.01)
　*A01D 101/00*　　　(2006.01)

(52) U.S. Cl.
　CPC ........... A01D 34/824 (2013.01); A01D 34/68 (2013.01); A01D 34/74 (2013.01); *A01D 2101/00* (2013.01)

(58) Field of Classification Search
　CPC ....... A01D 34/824; A01D 34/68; A01D 34/74
　See application file for complete search history.

(56) References Cited

U.S. PATENT DOCUMENTS

| | | | | |
|---|---|---|---|---|
| 4,321,784 | A | * | 3/1982 | Wood ..................... A01D 34/74 |
| | | | | 280/43.13 |
| 4,525,989 | A | * | 7/1985 | Lane ................... A01D 34/828 |
| | | | | 56/320.1 |

(Continued)

FOREIGN PATENT DOCUMENTS

| | | | | |
|---|---|---|---|---|
| CN | 201167481 | Y | * | 12/2008 |
| CN | 201557389 | U | * | 8/2010 |

(Continued)

OTHER PUBLICATIONS

English Translation of JP S61152224 (Year: 1986).*

(Continued)

*Primary Examiner* — Claude J Brown
(74) *Attorney, Agent, or Firm* — Greenberg Traurig, LLP

(57)　　　　ABSTRACT

A push power tool includes a motor, a body, a traveling device, a handle, and an operating device. The handle is connected to the body and configured for a user to hold. The operating device is configured for the user to operate. The operating device includes a first operating member and a second operating member. The first operating member is movable relative to the handle to control the traveling mode of the push power tool. The second operating member is movable relative to the handle to control the output power of the push power tool. In the push power tool, the first operating member includes a first operating portion disposed on a side of the handle facing away from the user, and the second operating member includes a second operating portion disposed on a side of the handle facing the user.

17 Claims, 11 Drawing Sheets

(56)                References Cited

U.S. PATENT DOCUMENTS

| | | | | |
|---|---|---|---|---|
| 4,905,463 | A | * | 3/1990 | Eilles ..................... A01D 34/74 |
| | | | | 280/43.13 |
| 2011/0088362 | A1 | * | 4/2011 | Rosa ....................... B60L 50/52 |
| | | | | 56/11.9 |
| 2014/0290006 | A1 | * | 10/2014 | Ejdehag ................. A01D 34/68 |
| | | | | 16/351 |
| 2020/0068802 | A1 | * | 3/2020 | Laurin ................... A01D 34/74 |
| 2021/0112711 | A1 | | 4/2021 | Nie |
| 2022/0279714 | A1 | | 9/2022 | Ro |
| 2023/0049230 | A1 | * | 2/2023 | Graham ................ A01D 34/69 |
| 2023/0098509 | A1 | * | 3/2023 | Shaffer ................. A01D 34/69 |
| | | | | 56/10.8 |

FOREIGN PATENT DOCUMENTS

| | | | | | |
|---|---|---|---|---|---|
| DE | 3627208 | C1 | * | 4/1990 | ............. A01D 34/74 |
| DE | 4026012 | A1 | | 2/1992 | |
| EP | 1721504 | A1 | | 2/2008 | |
| EP | 2875710 | A1 | * | 5/2015 | ............. A01D 34/74 |
| EP | 2805597 | A1 | | 4/2016 | |
| EP | 2875709 | A1 | | 5/2018 | |
| EP | 3090613 | A1 | | 9/2018 | |
| EP | 4039075 | A1 | | 8/2022 | |
| JP | S61152224 | | * | 9/1986 | |
| JP | S61152224 | U | * | 9/1986 | |
| JP | H0172027 | U | * | 5/1989 | |
| WO | 2021203697 | A1 | | 10/2021 | |
| WO | 2023018830 | A1 | | 2/2023 | |
| WO | WO-2024006111 | A1 | * | 1/2024 | ............. A01D 34/69 |

OTHER PUBLICATIONS

English Translation of DE-3627208-C1 (Year: 1990).*
English Translation of CN-201557389-U (Year: 2010).*
English Translation of CN-201167481-Y (Year: 2008).*
English Translation of H0172027-U (Year: 1989).*

* cited by examiner

700

800

600

600

700

605

601

606

602

603

604

600

PUSH POWER TOOL

RELATED APPLICATION INFORMATION

This application claims the benefit under 35 U.S.C. § 119(a) of Chinese Patent Application No. CN 202211394283.3, filed on Nov. 8, 2022, which application is incorporated herein by reference in its entirety.

TECHNICAL FIELD

The present application relates to the technical field of power tools and, in particular, to a push power tool.

BACKGROUND

A mower is a commonly used garden power tool, widely applied to parks, communities, farms, and other places with lots of vegetation, and used for pruning lawns, bushes, and the like. For places with large vegetation areas, a push mower is more convenient to operate and more efficient, so the push mower is more widely used. The handle part of the push mower generally includes a self-traveling trigger and a blade trigger. The self-traveling trigger is operated, so as to control the self-traveling function of the push mower. The blade trigger is operated, so as to control the cutting function of cutting blades of the push mower.

The existing push mowers generally adopt a design with the blade trigger in the front and the self-traveling trigger in the rear. When holding the handle part, a user uses the palm part to control the self-traveling trigger and uses the finger part to operate the blade trigger. However, since the push mower inevitably needs to turn during the mowing process, the self-traveling function generally needs to be stopped when the push mower turns. At this time, the user needs to release the palm to stop the self-traveling function. Since the flexibility of the palm is relatively poor, the operation is very inconvenient. Moreover, after the push mower turns, the palm of the user needs to approach and hold the self-traveling trigger again. This operation requires a large range of motion, is inconvenient, and is time-consuming and labor-intensive.

SUMMARY

A push power tool includes a motor driving a cutting part to rotate to mow; a body accommodating at least part of the motor; a traveling device including traveling wheels; a handle connected to the body and configured for a user to hold; and an operating device configured for the user to operate. The operating device includes a first operating member movable relative to the handle to control the traveling mode of the push power tool; and a second operating member movable relative to the handle to control the output power of the push power tool. The first operating member includes a first operating portion disposed on a side of the handle facing away from the user, and the second operating member includes a second operating portion disposed on a side of the handle facing the user.

In some examples, the first operating portion is configured for the user to rotate by a certain angle toward the handle, where the angle is greater than or equal to 10° and less than or equal to 60°.

In some examples, the push power tool further includes a mounting shaft connected to the handle through connectors, and the operating device is disposed on the mounting shaft.

In some examples, the push power tool further includes a switch box disposed on the mounting shaft, and the switch box is operated by the user to control the push power tool.

In some examples, the push power tool includes a sensing device disposed circumferentially relative to the mounting shaft, and the sensing device is configured to sense the operating device.

In some examples, the sensing device includes a first magnetic element and a first magnetic sensor.

In some examples, the handle includes connecting portions mounted to the body and a grip for the user to hold, and the grip is integrally formed with the connecting portions.

In some examples, the push power tool further includes a front height adjustment mechanism, where the front height adjustment mechanism is used for adjusting the height of a front part of the body relative to the ground and includes a first elastic member and a front height adjustment rotating shaft, where one end of the first elastic member is connected to the body, and the other end of the first elastic member is connected to the front height adjustment rotating shaft.

In some examples, the push power tool further includes a rear height adjustment mechanism, where the rear height adjustment mechanism is used for adjusting the height of a rear part of the body relative to the ground and includes a second elastic member and a rear height adjustment rotating shaft, where one end of the second elastic member is connected to the body, and the other end of the second elastic member is connected to the rear height adjustment rotating shaft.

In some examples, the push power tool further includes a handle height adjustment mechanism, where the handle height adjustment mechanism includes an external toothed disc, an internal toothed disc, and a knob, where the internal toothed disc is disposed on the body, the external toothed disc rotates in mesh with the internal toothed disc, and the knob penetrates a connecting portion of the handle and is movably connected to the external toothed disc.

DETAILED DESCRIPTION

Figure 1:
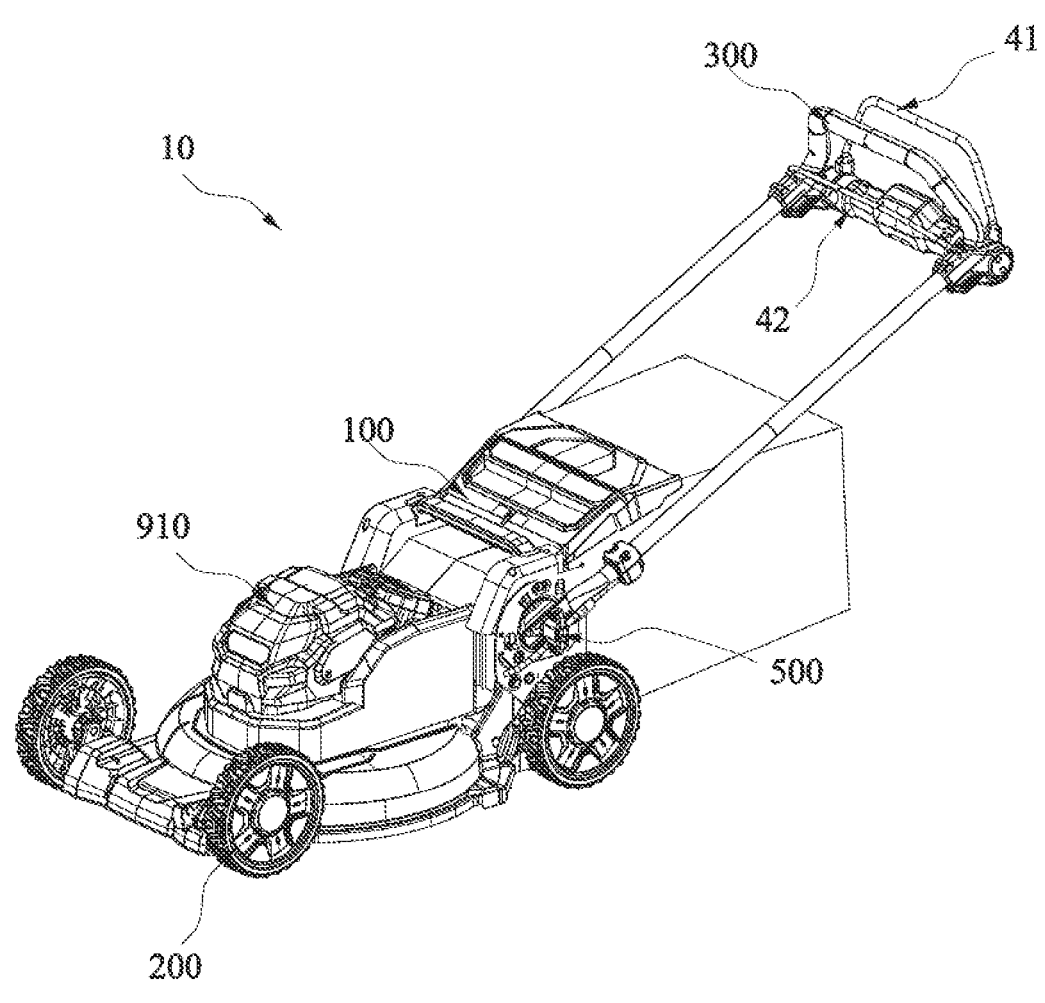
FIG. 1 is a structural view of a push mower according to the present application.

Before any examples of this application are explained in detail, it is to be understood that this application is not limited to its application to the structural details and the arrangement of components set forth in the following description or illustrated in the above drawings.

In this application, the terms "comprising", "including", "having" or any other variation thereof are intended to cover an inclusive inclusion such that a process, method, article or device comprising a series of elements includes not only those series of elements, but also other elements not expressly listed, or elements inherent in the process, method, article, or device. Without further limitations, an element defined by the phrase "comprising a . . . " does not preclude the presence of additional identical elements in the process, method, article, or device comprising that element.

In this application, the term "and/or" is a kind of association relationship describing the relationship between associated objects, which means that there can be three kinds of relationships. For example, A and/or B can indicate that A exists alone, A and B exist simultaneously, and B exists alone. In addition, the character "/" in this application generally indicates that the contextual associated objects belong to an "and/or" relationship.

In this application, the terms "connection", "combination", "coupling" and "installation" may be direct connection, combination, coupling or installation, and may also be indirect connection, combination, coupling or installation. Among them, for example, direct connection means that two members or assemblies are connected together without intermediaries, and indirect connection means that two members or assemblies are respectively connected with at least one intermediate members and the two members or assemblies are connected by the at least one intermediate members. In addition, "connection" and "coupling" are not limited to physical or mechanical connections or couplings, and may include electrical connections or couplings.

In this application, it is to be understood by those skilled in the art that a relative term (such as "about", "approximately", and "substantially") used in conjunction with quantity or condition includes a stated value and has a meaning dictated by the context. For example, the relative term includes at least a degree of error associated with the measurement of a particular value, a tolerance caused by manufacturing, assembly, and use associated with the particular value, and the like. Such relative term should also be considered as disclosing the range defined by the absolute values of the two endpoints. The relative term may refer to plus or minus of a certain percentage (such as 1%, 5%, 10%, or more) of an indicated value. A value that did not use the relative term should also be disclosed as a particular value with a tolerance. In addition, "substantially" when expressing a relative angular position relationship (for example, substantially parallel, substantially perpendicular), may refer to adding or subtracting a certain degree (such as 1 degree, 5 degrees, 10 degrees or more) to the indicated angle.

In this application, those skilled in the art will understand that a function performed by an assembly may be performed by one assembly, multiple assemblies, one member, or multiple members. Likewise, a function performed by a member may be performed by one member, an assembly, or a combination of members.

In this application, the terms "up", "down", "left", "right", "front", and "rear" and other directional words are described based on the orientation or positional relationship shown in the drawings, and should not be understood as limitations to the examples of this application. In addition, in this context, it also needs to be understood that when it is mentioned that an element is connected "above" or "under" another element, it can not only be directly connected "above" or "under" the other element, but can also be indirectly connected "above" or "under" the other element through an intermediate element. It should also be understood that orientation words such as upper side, lower side, left side, right side, front side, and rear side do not only represent perfect orientations, but can also be understood as lateral orientations. For example, lower side may include directly below, bottom left, bottom right, front bottom, and rear bottom.

In this application, the terms "controller", "processor", "central processor", "CPU" and "MCU" are interchangeable. Where a unit "controller", "processor", "central processing", "CPU", or "MCU" is used to perform a specific function, the specific function may be implemented by a single aforementioned unit or a plurality of the aforementioned unit.

In this application, the term "device", "module" or "unit" may be implemented in the form of hardware or software to achieve specific functions.

In this application, the terms "computing", "judging", "controlling", "determining", "recognizing" and the like refer to the operations and processes of a computer system or similar electronic computing device (e.g., controller, processor, etc.).

The present application discloses a push power tool 10. In some specific examples, the push power tool 10 may be a push mower. In addition to the push mower, in some other examples, the push power tool 10 may also be another push power tool with an operating device 41 for a user to operate. The specific types are not listed here. The specific structure of the push power tool 10 is described below by using the push mower as an example.

As shown in FIGS. 1 to 16, the push power tool 10 includes a motor 910, a mowing part, a body 100, a traveling device 200, a handle 300, and the operating device 41. Specifically, the motor 910 is the main power component and is used for driving a cutting part 920 to rotate for the mowing operation. The mowing part is a cutting blade, and multiple cutting blades may be provided according to requirements. The body 100 is the main mounting component and is used for accommodating at least part of the motor 910 and mounting the handle 300 and the traveling device 200. The traveling device 200 includes traveling wheels. The traveling wheels include front wheels and rear wheels. Multiple front wheels and rear wheels may be provided according to requirements. In some specific examples, as shown in FIG. 1, two front wheels and two rear wheels are disposed on the body 100. The handle 300 is connected to the body 100 and configured for the user to hold.

The operating device 41 is configured for the user to operate. The push power tool 10 may switch the working mode by operating the operating device 41. Specifically, the operating device 41 includes a first operating member 401 and a second operating member 402. The first operating member 401 is movable relative to the handle 300 to control the traveling mode of the push power tool 10. The second operating member 402 is movable relative to the handle 300 to control the output power of the push power tool 10. The first operating member 401 includes a first operating portion 4011 disposed on a side of the handle 300 facing away from the user, and the second operating member 402 includes a second operating portion 4021 disposed on a side of the handle 300 facing the user.

The push power tool 10 needs to turn frequently during the mowing operation, and the self-traveling function generally needs to be stopped during the turning process, but the mowing operation needs to continue. Therefore, when the user operates the push power tool 10 to turn, the first operating member 401 needs to be operated and the state of the second operating member 402 is kept unchanged. In the present application, the first operating member 401 is disposed on a side facing away from the user so that the user can operate the first operating member 401 with fingers flexibly, saving time and efforts; and the second operating member 402 is disposed on a side facing the user so that the user can use the palm to hold the second operating member 402 to stably keep the state of the second operating member 402 unchanged.

The first operating portion 4011 is configured for the user to rotate by a certain angle toward the handle 300, where the angle is greater than or equal to 10° and less than or equal to 60°. For example, the angle may be 10°, 20°, 30°, 40°, 50°, or 60°. The second operating portion 4021 is configured for the user to rotate by a certain angle toward the handle 300, where the angle is greater than or equal to 10° and less than or equal to 60°. For example, the angle may be 10°, 20°, 30°, 40°, 50°, or 60°. The maximum angle by which the first operating portion 4011 can rotate may be the same as or different from the maximum angle at which the second operating portion 4021 can rotate, which is not specifically limited in the present application.

Figure 2:
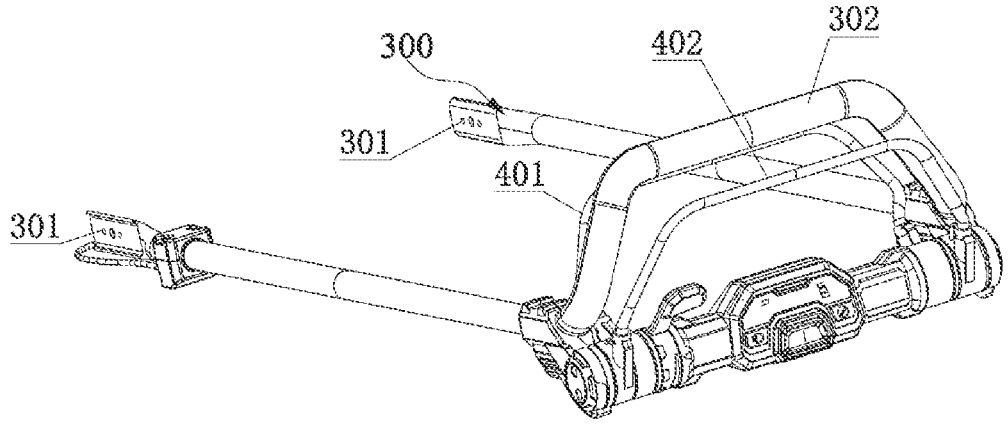
FIG. 2 is a structural view of a handle, an operating device, and a sensing device of a push mower according to the present application.
Figure 3:
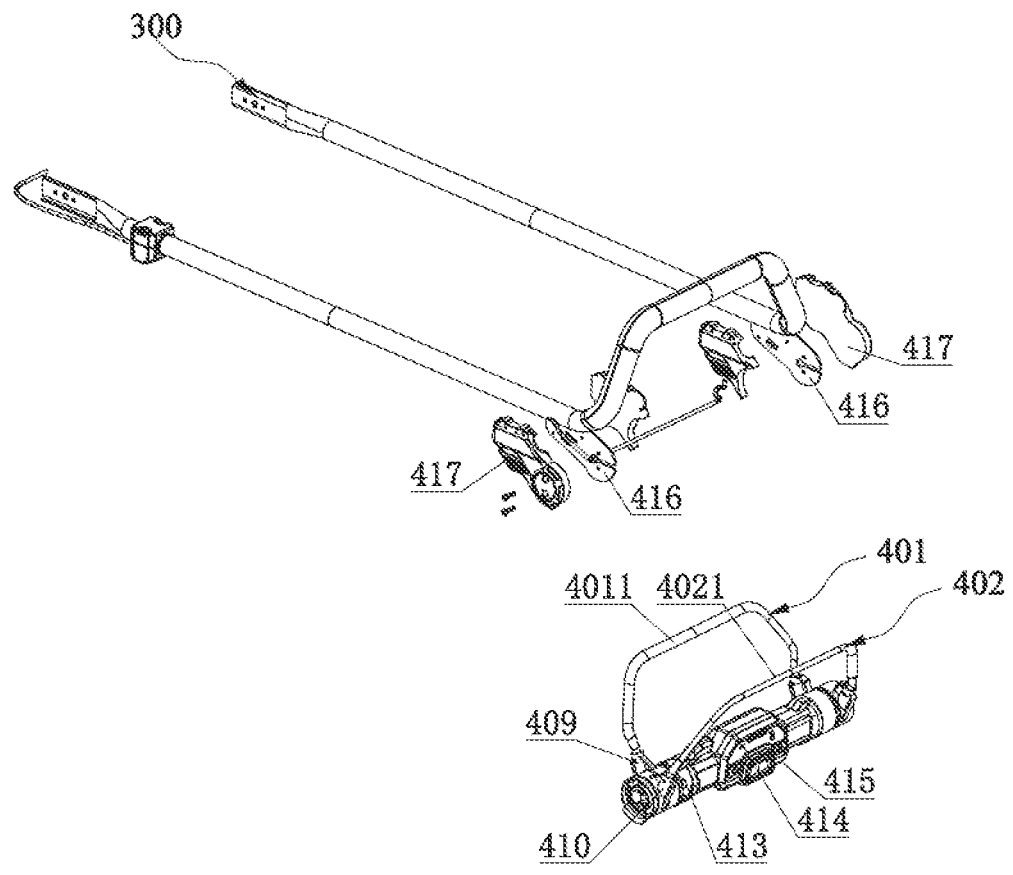
FIG. 3 is an exploded view of a handle, an operating device, and a sensing device of a push mower according to the present application.
Figure 4:
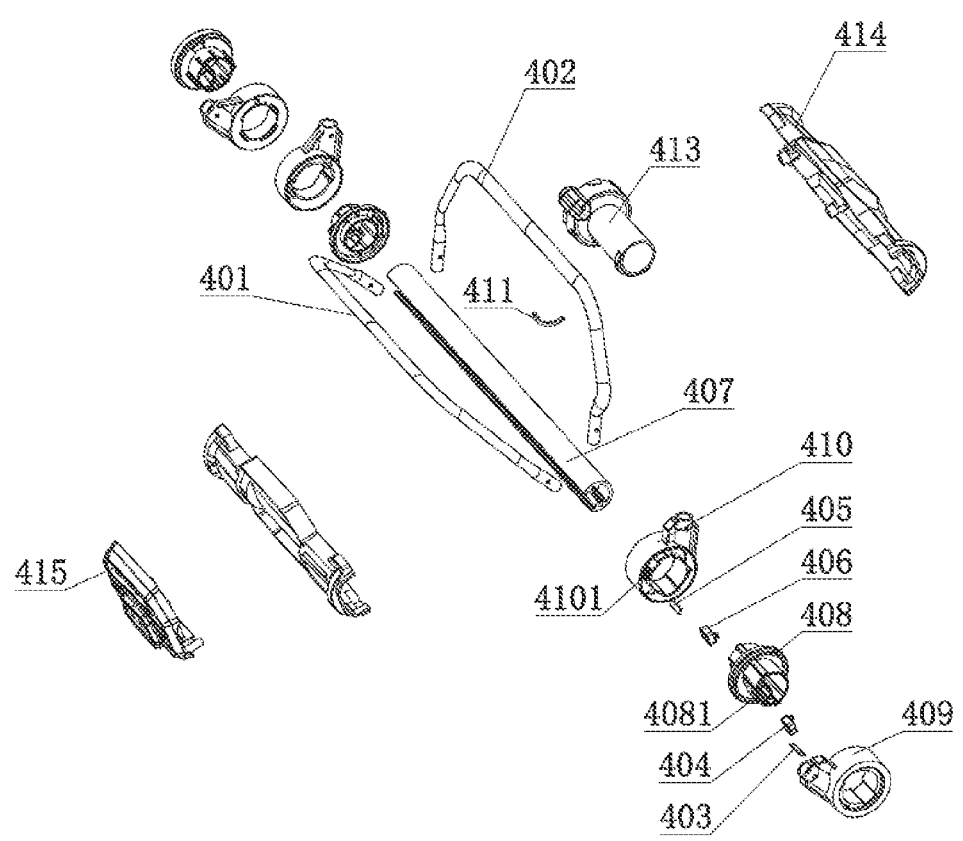
FIG. 4 is an exploded view of an operating device and a sensing device of a push mower from a perspective according to the present application.
Figure 5:
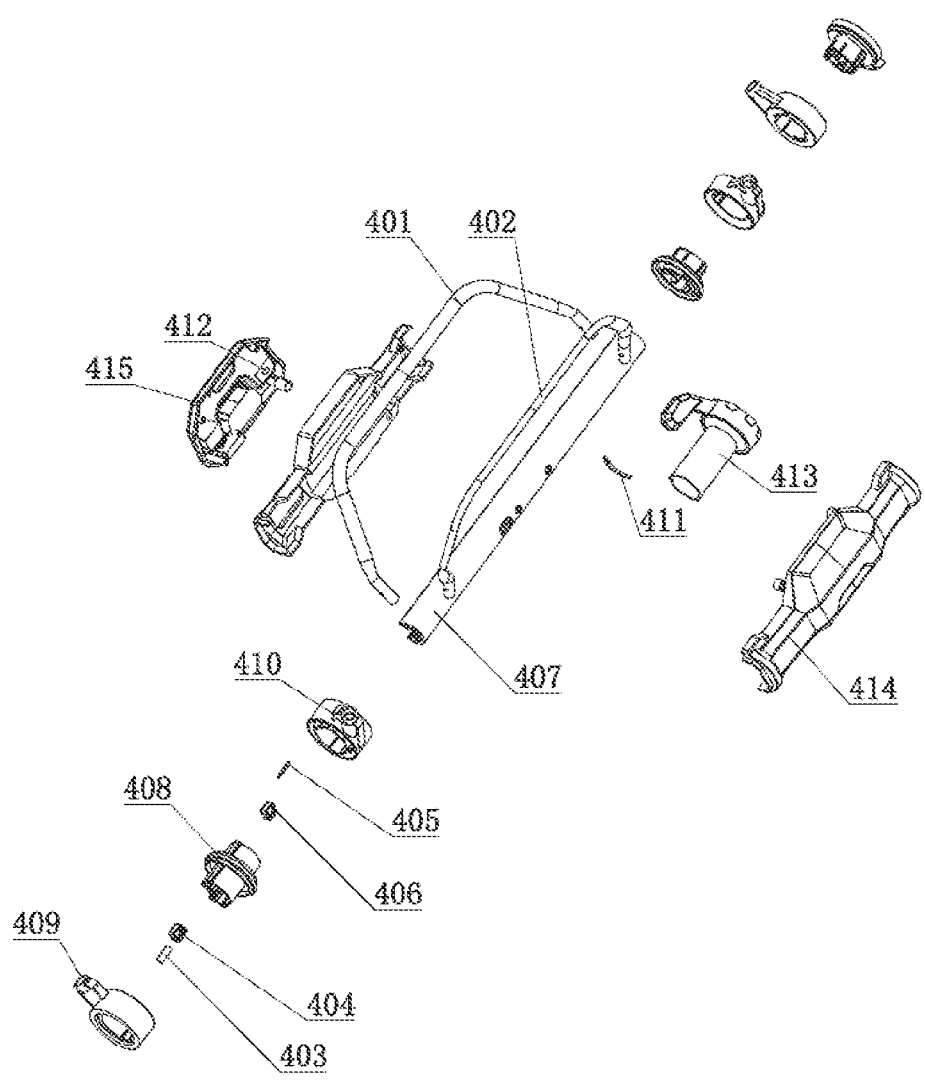
FIG. 5 is an exploded view of an operating device and a sensing device of a push mower from another perspective according to the present application.
Figure 6:
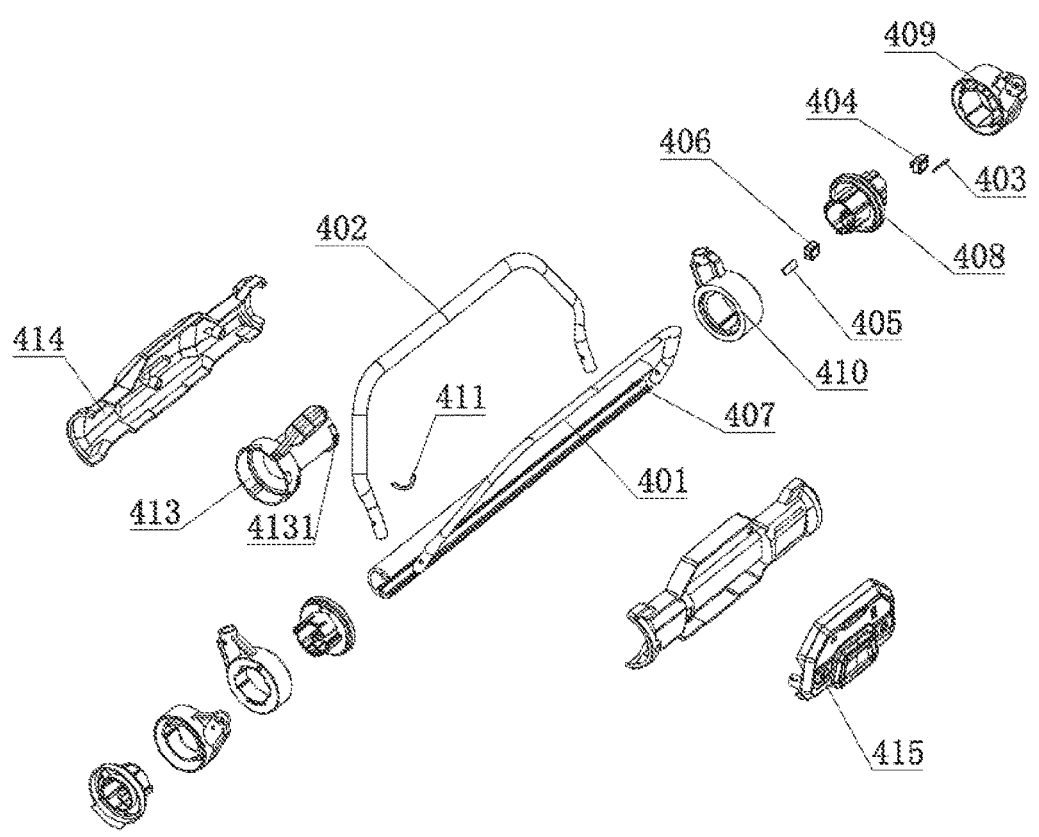
FIG. 6 is an exploded view of an operating device and a sensing device of a push mower from another perspective according to the present application.

With continued reference to FIG. 2, the handle 300 includes two connecting portions 301 and a grip 302. The two connecting portions 301 are connected to two sides of the grip 302. The connecting portions 301 are used for connecting the body 100. The grip 302 is used for the user to hold. In the operation direction of the push power tool 10, the first operating portion 4011 and the second operating portion 4021 are located on the two sides of the grip 302. In some examples, the grip 302 and the connecting portions 301 are integrally formed. In some other examples, the grip 302 and the connecting portions 301 are independent parts and are connected through connectors 416.

The two connecting portions 301 and the grip 302 are connected to form a U-shaped rod-like structure. In some other examples, the grip 302 has a U-shaped rod-like structure, the two connecting portions 301 are separately connected to two free ends of the grip 302, and a plane where the two connecting portions 301 are located forms an included angle with a plane where the grip 302 is located so that the handle 300 is convenient for the user to hold. In some examples, both the first operating member 401 and the second operating member 402 are U-shaped rod-like structures, and the first operating portion 4011 and the second operating portion 4021 are both parallel to the part of the grip 302 for the user to hold and are located on the two sides of the grip 302.

To rotationally fix the operating device 41 on the two sides of the grip 302 of the handle 300, with continued reference to FIGS. 3 to 6, the push power tool 10 further includes the connectors 416 and a mounting shaft 407, the mounting shaft 407 is connected to the handle 300 through the connectors 416, and the operating device 41 is disposed on the mounting shaft 407.

The mounting shaft 407 is a hollow cylindrical rod. The connectors 416 are plate-shaped structures. The connectors 416 are separately disposed at two ends of the mounting shaft 407. One end of the connector 416 is connected to the mounting shaft 407, and the other end of the connector 416 is connected to the connecting portion 301 of the handle 300 on the corresponding side. In some more specific examples, the connector 416 is welded to the connecting portion 301, and the mounting shaft 407 and the connector 416 are connected through a clamping member. The mounting shaft 407 is connected to the connecting portion 301 through the connector 416, and the connector 416 is welded to the connecting portion 301 so that the following is avoided: the mounting shaft 407 is directly mounted on the connecting portion 301 through a screw, and multiple holes are punched on the connecting portion 301. The strength of the handle 300 is ensured, and the installation of the mounting shaft 407 is simple and stable. A connecting cover 417 is further provided at each connector 416. The connecting cover 417 includes a first half cover and a second half cover that are split. A first half groove is formed on the first half cover, and a second half groove is formed on the second half cover. After the first half cover and the second half cover are buckled together from two sides of the connecting portion 301 of the handle 300, the first half groove and the second half groove form a round hole for accommodating the connecting portion 301. When the connecting cover 417 is assembled, the first half cover and the second half cover may be assembled from the left and right sides of the connector 416 and the handle 300. After assembled, the first half cover and the second half cover are fixed by connecting screws. In some examples, the first half cover and the second half cover have different shapes, where the first half cover covers the entire connector 416 and the second half cover covers part of the connector 416. Two ends of the mounting shaft 407 are separately connected to two connectors 416. The connecting portion 301 is configured to be hollow for the wire to pass through. The connecting portion 301 includes a wiring hole, and the connector 416 includes a guide groove. The wire passes through the connecting portion 301 from the wiring hole, is guided by the guide groove, and passes through the mounting shaft 407.

In some other examples, the mounting shaft 407 may also be directly connected to the handle 300. For example, two ends of the mounting shaft 407 are directly welded to the two connecting portions 301 of the handle 300, or the mounting shaft 407 is connected to an intermediate structure of the grip 302 through a connecting plate. In addition, the connection manner between the mounting shaft 407 and the connector 416 is not limited to engagement with a clamping member. In addition to the engagement with a clamping member, the screw connection, welding, magnetic attraction, or bonding may also be used. The connection manner between the connector 416 and the connecting portion 301 is not limited to welding and may also be the engagement with a clamping member, the screw connection, magnetic attraction, bonding, or the like.

With continued reference to FIGS. 3 to 6, the push power tool 10 further includes a sensing device 42 disposed circumferentially relative to the mounting shaft 407, and the sensing device 42 is configured to sense the operating device 41. Specifically, the sensing device 42 includes a first magnetic element 403 and a first magnetic sensor 404. The first magnetic element 403 is rotatable synchronously with the first operating portion 4011. The first magnetic sensor 404 is fixedly disposed relative to the handle 300 and is used for sensing the first magnetic element 403. When sensing the first magnetic element 403, the first magnetic sensor 404 can send a signal to a control mechanism of the push power tool 10, and the control mechanism can control the traveling mode of the mower to change according to the signal.

In some examples, the first magnetic element 403 is a magnet block, the first magnetic sensor 404 is a Hall element, and the cooperation between the Hall element and the magnet block is safe and reliable. The Hall element and the magnet block move relative to each other in the circumferential direction. The smaller movement distance of the magnet block corresponds to the larger movement distance of the first operating portion 4011. No matter where the first operating portion 4011 moves, the magnet block is always within the sensing range of the Hall element, and the sensing is more sensitive. Moreover, this setting is safer. Even if the user accidentally loosens his or her hand a little when pressing the first operating portion 4011, the Hall element can still sense the magnet block. In other words, the user has a larger operating margin when operating the first operating portion 4011 and this setting is more tolerant to errors so that the user does not need to tightly press the first operating portion 4011 with his or her hand, which is more convenient for the operation.

With continued reference to FIGS. 3 to 6, the sensing device 42 includes a second magnetic element 405 and a second magnetic sensor 406. The second magnetic element 405 is rotatable synchronously with the second operating portion 4021. The second magnetic sensor 406 is fixedly disposed relative to the handle 300 and is used for sensing the second magnetic element 405. When sensing the second magnetic element 405, the second magnetic sensor 406 can send a signal to the control mechanism of the push power tool 10, and the control mechanism can control the output power of the mower to change according to the signal. In some examples, the second magnetic element 405 is a magnet block, the second magnetic sensor 406 is a Hall element, and the cooperation between the Hall element and the magnet block is safe and reliable.

To achieve the rotational connection between the first operating member 401 and the mounting shaft 407 and the rotational connection between the second operating member 402 and the mounting shaft 407, with continued reference to FIGS. 3 to 6, the sensing device 42 further includes two rotational connection assemblies, each rotational connection assembly includes a fixing member 408, a first rotary member 409, and a second rotary member 410, the two rotational connection assemblies are separately disposed on two sides of the mounting shaft 407 in the axial direction, and one end of the rotational connection assembly facing away from the mounting shaft 407 abuts against the connector 416 on the corresponding side.

The fixing member 408 is disposed on the side of the mounting shaft 407. The fixing member 408 is a stepped columnar structure and specifically includes a first rotating support portion, a partition portion, and a second rotating support portion connected in sequence. The diameter of the partition portion is greater than the diameter of the first rotating support portion and the diameter of the second rotating support portion. The diameter of the first rotating support portion may be the same as or different from the diameter of the second rotating support portion.

The first rotary member 409 and the second rotary member 410 are both annular structures. The first rotary member 409 is rotationally connected to the outer side of the first rotating support portion. The end of the first operating member 401 is fixedly connected to the first rotary member 409. The first magnetic element 403 is disposed in a first groove of the first rotary member 409, and the first magnetic sensor 404 is disposed in a first mounting groove 4081 on the first rotating support portion. In this manner, not only can the Hall element be prevented from being contaminated, but also the accidents caused by the user bringing magnetic substances and approaching the push power tool 10 can be prevented. When the first operating member 401 is driven by the fingers of the user to rotate toward or away from the grip 302 of the handle 300, the first operating member 401 can drive the first rotary member 409 to rotate around the first rotating support portion, thereby causing the position of the first magnetic element 403 to change. When detecting the change of the magnetic field of the first magnetic element 403, the first magnetic sensor 404 can send the signal to the control mechanism.

The second rotary member 410 is rotatably connected to the outer side of the second rotating support portion. The end of the second operating member 402 is fixedly connected to the second rotary member 410. The second magnetic element 405 is disposed in a second mounting groove 4101 of the second rotary member 410. The second magnetic sensor 406 is disposed in a second groove on the second rotating support portion. When the first operating member 401 is driven by the palm of the user to rotate toward or away from the grip 302 of the handle 300, the second operating member 402 can drive the second rotary member 410 to rotate around the second rotating support portion, thereby causing the position of the second magnetic element 405 to change. When detecting the change of the magnetic field of the second magnetic element 405, the second magnetic sensor 406 can send the signal to the control mechanism.

The end of the first operating member 401 is plug-fitted with the first rotary member 409. A first plug portion is disposed on the first rotary member 409. A first plug hole is formed on the first plug portion. The first operating member 401 is a U-shaped rod-like structure, and the end of the first operating member 401 can be inserted into the first plug hole so as to achieve the assembly of the first operating member 401 and the first rotary member 409. The end of the second operating member 402 is plug-fitted with the second rotary member 410. A second plug portion is disposed on the second rotary member 410. A second plug hole is formed on the second plug portion. The second operating member 402 is a U-shaped rod-like structure, and the end of the second operating member 402 can be inserted into the second plug hole so as to achieve the assembly of the second operating member 402 and the second rotary member 410.

The push power tool 10 further includes a switch box 415 disposed on the mounting shaft 407, and the switch box 415 is operated by the user to control the push power tool 10. To mount the switch box 415, a mounting sleeve 414 is sleeved on the mounting shaft 407, and the switch box 415 is mounted on the mounting sleeve 414. The switch box 415 is disposed on the mounting shaft 407 so that the switch box 415 is not likely to interfere with the handle 300, and the holding space is sufficient, which is convenient for the user to operate the push power tool 10. The switch box 415 is provided with a headlamp switch that controls overhead lighting, a start stop switch that controls the motor 910, and a power switch that controls the powering of the entire tool. All switches are disposed on the switch box 415 so that the need for machining holes and grooves on the handle 300 is avoided, and the assembly difficulty is reduced while the user operation is facilitated.

The push power tool 10 further has a speed regulation mode. To control the speed regulation mode, the sensing device 42 further includes a speed regulator 413, a third magnetic element 411, and a third magnetic sensor 412. The speed regulator 413 is sleeved on the mounting shaft 407. A speed regulation handle for the user to toggle and turn is disposed on the speed regulator 413. A third mounting groove 4131 is disposed on the speed regulator 413. The third magnetic element 411 is mounted in the third mounting groove 4131. The third magnetic sensor 412 is mounted in the switch box 415. A printed circuit board (PCB) for controlling the headlamp switch is disposed in the switch box 415, and the third magnetic sensor 412 is disposed on a side of the PCB facing the third magnetic element 411. In some specific examples, the third magnetic element 411 is a magnet block, and the third magnetic sensor 412 is a Hall element.

Figure 7:
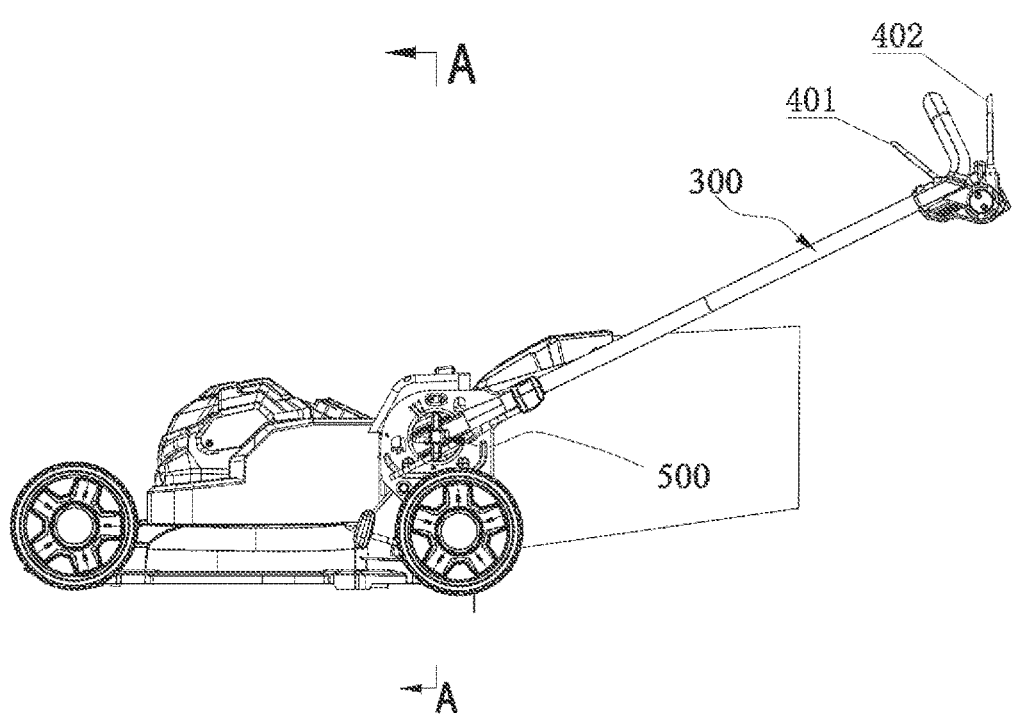
FIG. 7 is a side view of a push mower according to the present application.
Figure 8:
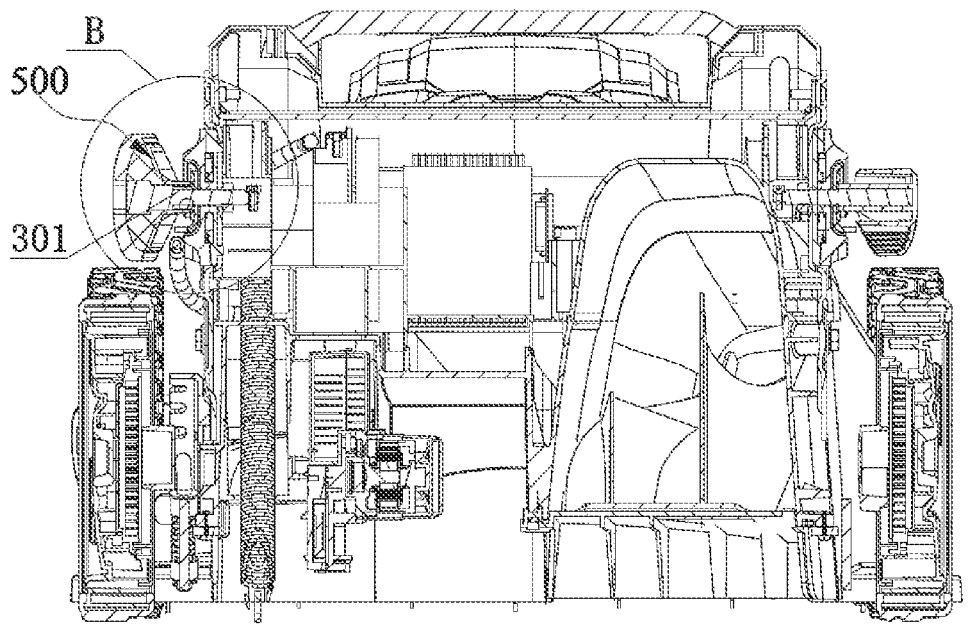
FIG. 8 is a sectional view taken along an A-A direction of FIG. 7.
Figure 9:
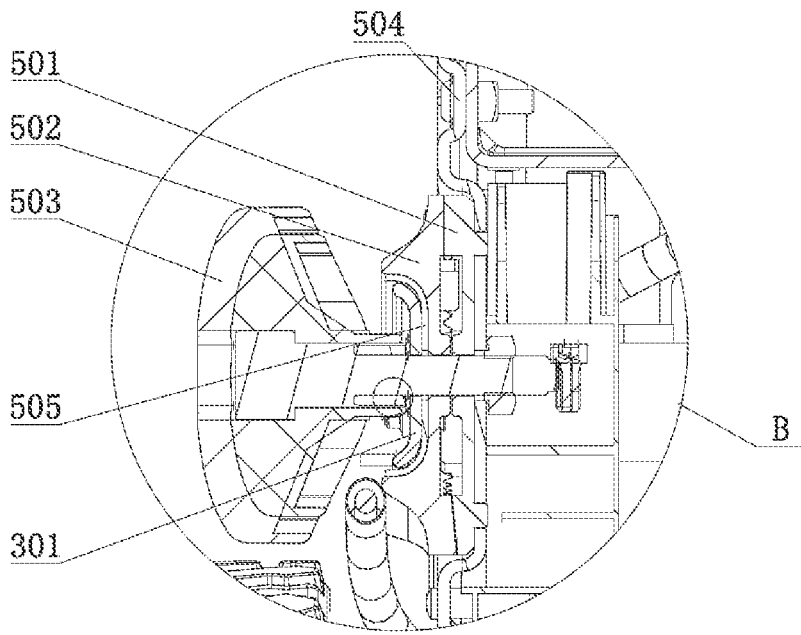
FIG. 9 is an enlarged view of a part B in FIG. 8.
Figure 10:
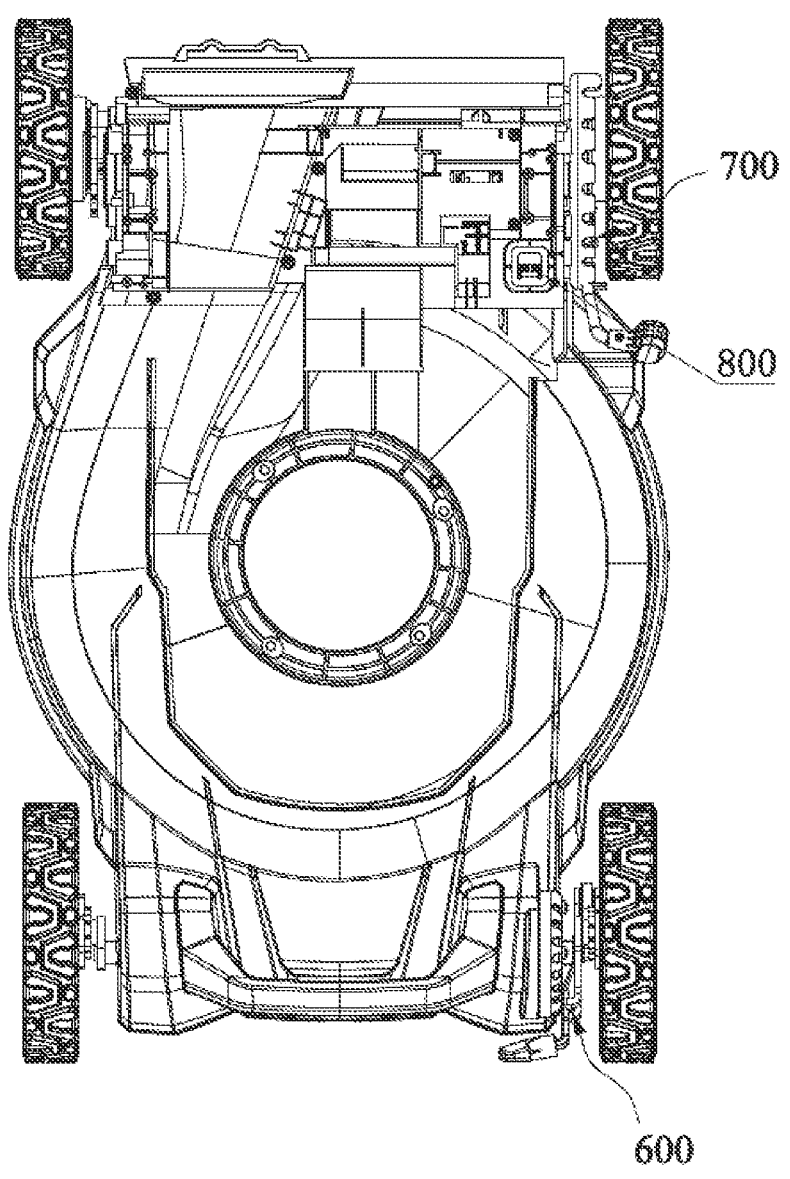
FIG. 10 is a top view of a base plate, a traveling device, a front height adjustment mechanism, and a rear height adjustment mechanism of a push mower according to the present application.
Figure 11:
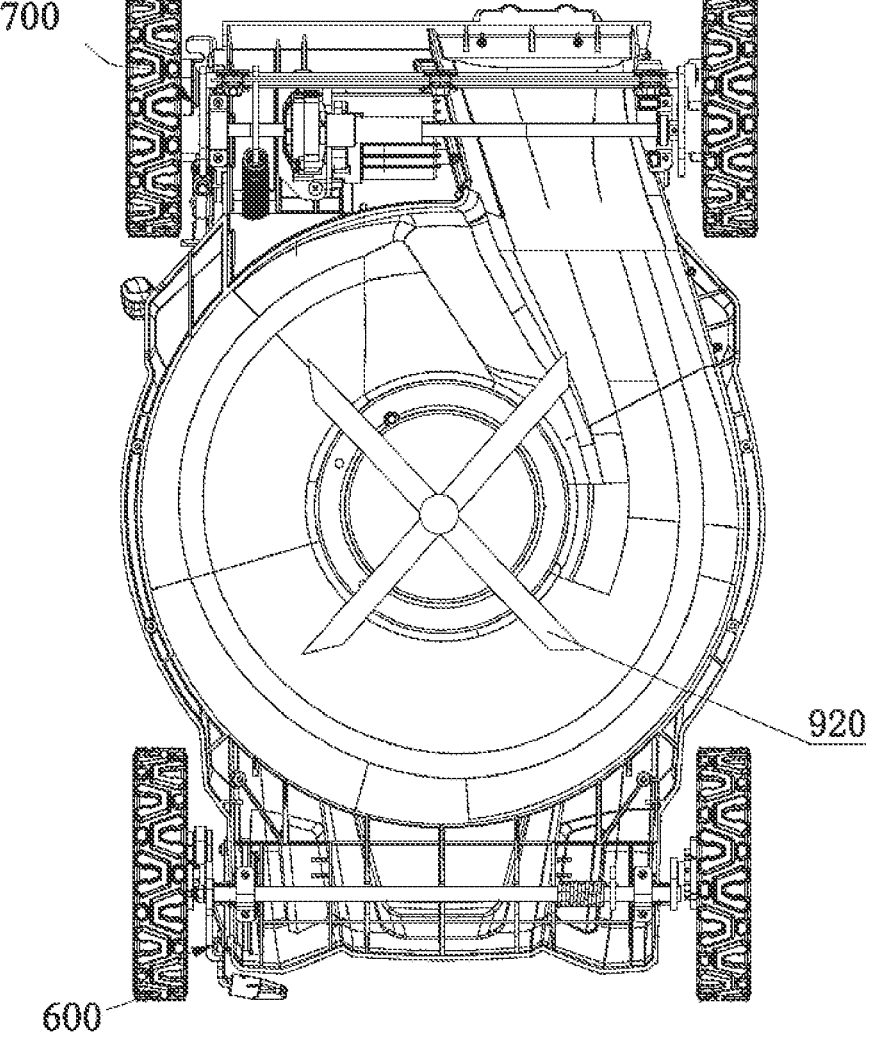
FIG. 11 is a bottom view of a base plate, a traveling device, a front height adjustment mechanism, and a rear height adjustment mechanism of a push mower according to the present application.
Figure 12:
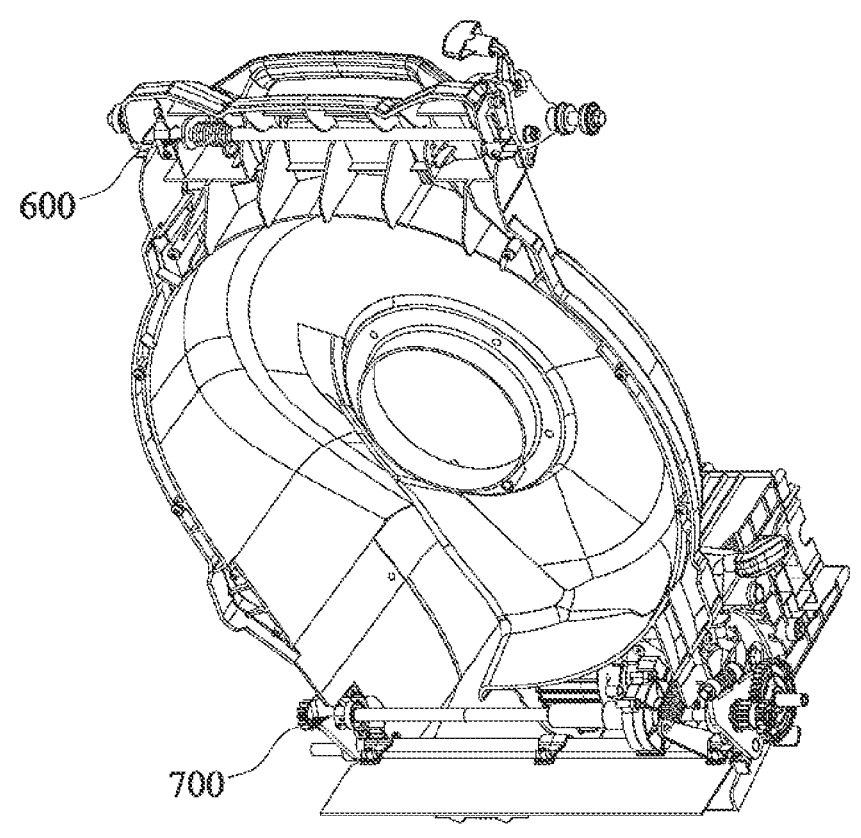
FIG. 12 is a structural view of a base plate, a traveling device, a front height adjustment mechanism, and a rear height adjustment mechanism of a push mower according to the present application.
Figure 13:
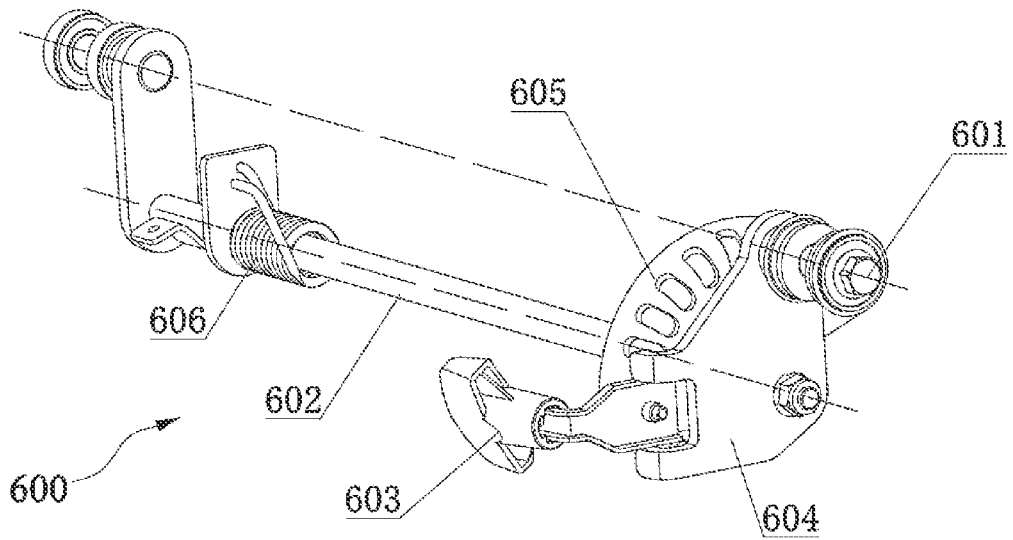
FIG. 13 is a structural view of a front height adjustment mechanism of a push mower from a certain perspective according to the present application.
Figure 14:
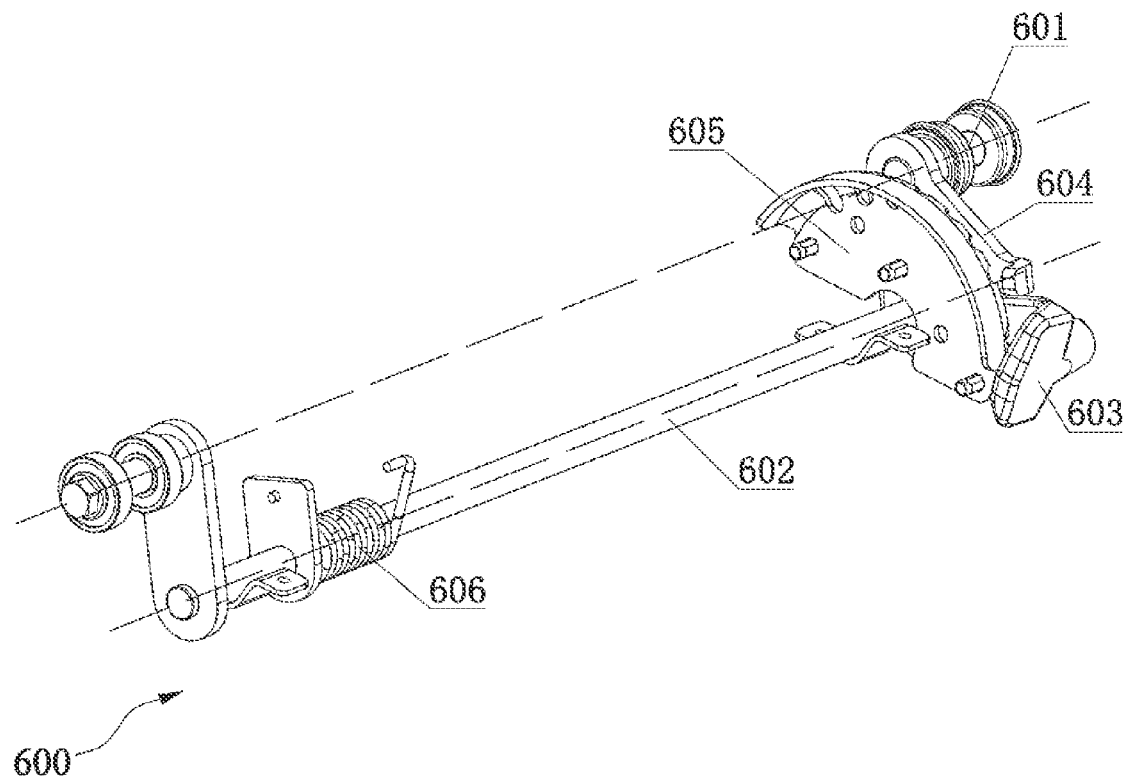
FIG. 14 is a structural view of a front height adjustment mechanism of a push mower from another perspective according to the present application.
Figure 15:
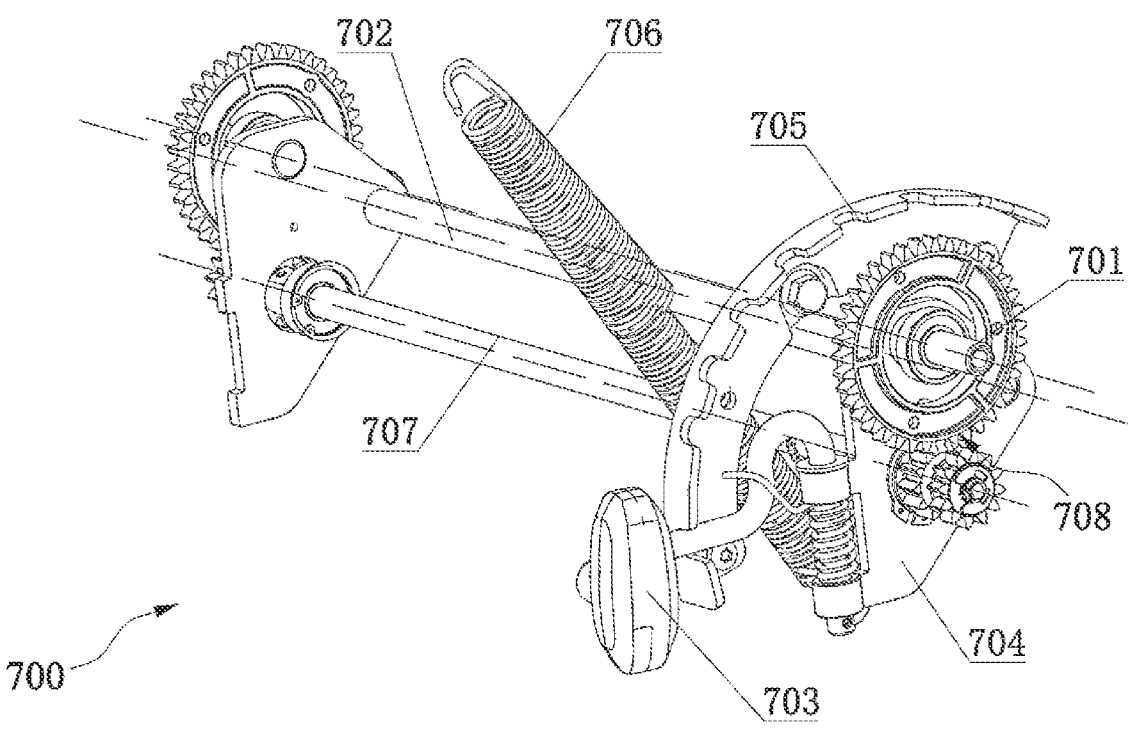
FIG. 15 is a structural view of a rear height adjustment mechanism of a push mower from a certain perspective according to the present application.
Figure 16:
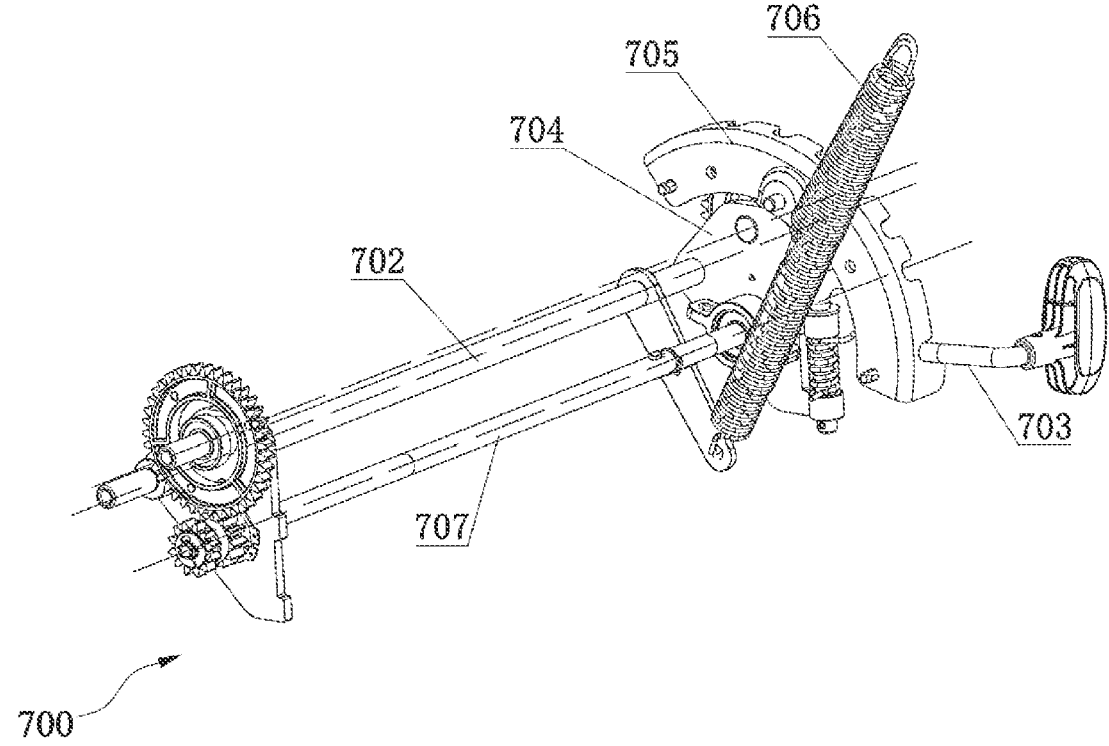
FIG. 16 is a structural view of a rear height adjustment mechanism of a push mower from another perspective according to the present application.

To facilitate users of different heights operating the push power tool 10, as shown in FIGS. 7 to 9, the push power tool 10 further includes a handle height adjustment mechanism 500, where the handle height adjustment mechanism 500 includes an external toothed disc 502, an internal toothed disc 501, and a knob 503, where the internal toothed disc 501 is disposed on the body 100, the external toothed disc 502 rotates in mesh with the internal toothed disc 501, and the knob 503 penetrates the connecting portion 301 of the handle 300 and is movably connected to the external toothed disc 502.

A support plate 504 is further provided between the inner toothed disc 501 and the body 100. The inner toothed disc 501 is connected to the support plate 504 through the connector 416. The support plate 504 is marked with a height gear scale. The external toothed disc 502 is provided with indicator marks. Through the correspondence between the indicator marks and the numbers on the height gear scale, the user can clearly know the current height gear of the handle 300.

A rubber pad 505 is further provided between the connecting portion 301 of the handle 300 and the external toothed disc 502. The rubber pad 505 can increase the friction between the connecting portion 301 and the external toothed disc 502 and improve the connection strength and connection stability.

As shown in FIGS. 10 to 14, the push power tool 10 further includes a front height adjustment mechanism 600 for adjusting the height of the front part of the body 100. Specifically, the front height adjustment mechanism 600 includes front axles 601, a front height adjustment rotating shaft 602, a front elastic piece 603, a front clamp 604, and a front gear plate 605. The front axle 601 is fixedly connected to the side of the front part of the body 100, and the front axles 601 are used for mounting the front wheels. The front height adjustment rotating shaft 602 is parallel to the straight line where the two front axles 601 are located, and the front height adjustment rotating shaft 602 and the two front axles 601 form a connecting rod mechanism through connecting rods. The front height adjustment rotating shaft 602 is fixedly connected to a base plate of the body 100. One end of the front clamp 604 is sleeved on the front axle 601, and the other end of the front clamp 604 is connected to the front elastic piece 603. The user may apply a force to the front elastic piece 603 to enable the front elastic piece 603 and the front clamp 604 to move away from the body 100 so that a clamping block on the front clamp 604 and the front gear plate 605 are unlocked. Multiple front gear holes are provided on the front gear plate 605, and the clamping block on the front clamp 604 engages with a certain front gear hole to limit the height of the front part of the body 100.

When the user needs to adjust the height of the front part of the body 100, the user pushes the front elastic piece 603 toward a side facing the front wheel to unlock the front clamp 604 and the front gear plate 605 and then applies a force to the front height adjustment rotating shaft 602 to adjust the height of the front part of the body 100. At this time, the front clamp 604 rotates around the front axle 601. Finally, after the height of the front part of the body 100 is adjusted in place, the front elastic piece 603 is released so as to reset the front clamp 604 and re-lock the front clamp 604 and the front gear plate 605.

The front height adjustment mechanism 600 further includes a first elastic member 606, where one end of the first elastic member 606 is connected to the body 100, and the other end of the first elastic member 606 is connected to the front height adjustment rotating shaft 602. When the height of the front part of the body 100 is adjusted, the base plate of the body 100 falls under the action of gravity, and the elastic force of the first elastic member 606 can offset the gravity. Therefore, the user only needs to gently hold the base plate to perform the height adjustment operation, saving time and efforts. In some specific examples, the first elastic member 606 is a torsion spring. The torsion spring is sleeved on the front height adjustment rotating shaft 602, one end of the torsion spring abuts against the base plate of the body 100, and the other end of the torsion spring is connected to a fixed plate fixed on the front height adjustment rotating shaft 602.

As shown in FIGS. 10 to 12 and FIGS. 15 and 16, the push power tool 10 further includes a rear height adjustment mechanism 700 for adjusting the height of the rear part of the body 100. Specifically, the rear height adjustment mechanism 700 includes rear axles 701, a rear height adjustment rotating shaft 702, a rear clamp 703, rear plates 704, a rear gear plate 705, a drive shaft 707, and gear assemblies 708. The rear axle 701 is fixedly connected to the side of the rear part of the body 100, and the rear axles 701 are used for mounting the rear wheels. The rear height adjustment rotating shaft 702 is parallel to the straight line where the two rear axles 701 are located, and the rear height adjustment rotating shaft 702 and the two rear axles 701 form a connecting rod mechanism through the rear plates 704. The rear height adjustment rotating shaft 702 is fixedly connected to the base plate of the body 100. One end of the rear plate 704 is sleeved on the rear axle 701, and the other end of the rear plate 704 is connected to the rear clamp 703. The user may apply a force to the rear clamp 703 to enable the rear clamp 703 to move away from the body 100. Multiple rear gear grooves are provided on the rear gear plate 705, and the rear clamp 703 engages with a certain rear gear groove to limit the height of the rear part of the body 100. The drive shaft 707 is transmissively connected to the rear axles 701 through the gear assemblies 708, and the drive shaft 707 is used for connecting an electric motor that drives the traveling wheels to rotate.

The rear height adjustment mechanism 700 further includes a second elastic member 706, where one end of the second elastic member 706 is fixedly connected to the body 100, and the other end of the second elastic member 706 is fixedly connected to the rear height adjustment rotating shaft 702. When the height of the rear part of the body 100 is adjusted, the base plate of the body 100 falls under the action of gravity, and the elastic force of the second elastic member 706 can offset the gravity. Therefore, the user only needs to gently hold the base plate to perform the height adjustment operation, saving time and efforts.

The second elastic member 706 is a tension spring. One end of the tension spring is connected to a tension spring hook 800 on the base plate of the body 100, and the other end of the tension spring is fixedly connected to the rear height adjustment rotating shaft 702.

The push power tool 10 further includes the control mechanism, and the control mechanism may be a centralized or distributed controller. For example, the controller may be an independent single-chip microcomputer or may be composed of multiple distributed single-chip microcomputers. The single-chip microcomputer can run control programs to control electronic components included in the push power tool 10 to implement their functions.

The basic principles, main features, and advantages of this application are shown and described above. It is to be understood by those skilled in the art that the aforementioned examples do not limit the present application in any form, and all technical solutions obtained through equivalent substitutions or equivalent transformations fall within the scope of the present application.

What is claimed is:

1. A push power tool, comprising:
a motor driving a cutting part to rotate to mow;
a body accommodating at least part of the motor;
a traveling device comprising traveling wheels;
a handle connected to the body and configured for a user to hold;
a mounting shaft connected to the handle through a plurality of connectors;
an operating device configured for the user to operate comprising a first operating member movable relative to the handle to control a traveling mode of the push power tool and a second operating member movable relative to the handle to control output power of the push power tool, the operating device being disposed on the mounting shaft, wherein the first operating member comprises a first operating portion disposed on a side of the handle facing away from the user, and the second operating member comprises a second operating portion disposed on a side of the handle facing the user; and
a sensing device disposed circumferentially relative to the mounting shaft, and the sensing device is configured to sense the operating device.

2. The push power tool of claim 1, wherein the first operating portion is configured for the user to rotate by a certain angle toward the handle, and the angle is greater than or equal to 10° and less than or equal to 60°.

3. The push power tool of claim 1, wherein the push power tool further comprises a switch box disposed on the mounting shaft, and the switch box is operated by the user to control the push power tool.

4. The push power tool of claim 1, wherein the sensing device comprises a first magnetic element and a first magnetic sensor.

5. The push power tool of claim 4, wherein the first magnetic element is disposed on a side of the first operating member facing the mounting shaft and is configured to rotate with the first operating member.

6. The push power tool of claim 1, wherein the handle comprises a plurality of connecting portions mounted to the body and a grip for the user to hold, and one of the plurality of connectors is integrally formed with one of the plurality of connecting portions.

7. The push power tool of claim 6, wherein one of the plurality of connectors is welded on one of the plurality of connecting portions.

8. The push power tool of claim 1, wherein the push power tool further comprises connecting covers, and one of the connecting covers is configured to cover at least part of one of the plurality of connectors.

9. The push power tool of claim 1, wherein the handle comprises a plurality of connecting portions mounted to the body and a grip for the user to hold, and the grip is integrally formed with the plurality of connecting portions.

10. The push power tool of claim 1, wherein the push power tool further comprises a front height adjustment mechanism, the front height adjustment mechanism is used for adjusting a height of a front part of the body relative to the ground and comprises a first elastic member and a front height adjustment rotating shaft, one end of the first elastic member is connected to the body, and another end of the first elastic member is connected to the front height adjustment rotating shaft.

11. The push power tool of claim 1, wherein the push power tool further comprises a rear height adjustment mechanism, the rear height adjustment mechanism is used for adjusting a height of a rear part of the body relative to the ground and comprises a second elastic member and a rear height adjustment rotating shaft, one end of the second elastic member is connected to the body, and another end of the second elastic member is connected to the rear height adjustment rotating shaft.

12. The push power tool of claim 1, further comprising a front height adjustment mechanism for adjusting a height of a front part of the body relative to the ground and a rear height adjustment mechanism for adjusting a height of a rear part of the body relative to the ground, wherein the front height adjustment mechanism comprises a torsion spring, and the rear height adjustment mechanism comprises a tension spring.

13. The push power tool of claim 1, wherein the push power tool further comprises a handle height adjustment mechanism, the handle height adjustment mechanism comprises an external toothed disc, an internal toothed disc, and a knob, the internal toothed disc is disposed on the body, the external toothed disc rotates in mesh with the internal toothed disc, and the knob penetrates a connecting portion of the handle and is movably connected to the external toothed disc.

14. A push power tool, comprising:
a motor driving a cutting part to rotate to mow;
a body accommodating at least part of the motor;
a traveling device comprising traveling wheels;
a handle connected to the body and configured for a user to hold;
a mounting shaft connected to the handle through a plurality of connectors;

wherein the handle comprises a connecting portion mounted to the body and a grip for the user to hold, and one of the plurality of connectors is integrally formed with the connecting portion; and an operating device configured for the user to operate comprising a first operating member movable relative to the handle to control a traveling mode of the push power tool and a second operating member movable relative to the handle to control output power of the push power tool, the operating device being disposed on the mounting shaft, wherein the first operating member comprises a first operating portion disposed on a side of the handle away from the user, and the second operating member comprises a second operating portion disposed on a side of the handle close to the user.

15. A push power tool, comprising:

a motor driving a cutting part to rotate to mow;

a body accommodating at least part of the motor;

a traveling device comprising traveling wheels;

a handle connected to the body and configured for a user to hold;

a mounting shaft connected to the handle through a plurality of connectors;

connecting covers, and one of the connecting covers is configured to cover at least part of one of the plurality of connectors; and an operating device configured for the user to operate comprising a first operating member movable relative to the handle to control a traveling mode of the push power tool and a second operating member movable relative to the handle to control output power of the push power tool, the operating device being dispose on the mounting shaft, wherein the first operating member is disposed on a side of the handle away from the user, and the second operating member is disposed on a side of the handle close to the user.

16. The push power tool of claim 15, wherein the first operating member is configured for the user to rotate by a certain angle toward the handle, and the angle is greater than or equal to 10° and less than or equal to 60°.

17. The push power tool of claim 15, wherein the push power tool further comprises a switch box disposed on the mounting shaft, and the switch box is operated by the user to control the push power tool.

* * * * *